July 30, 1963 C. E. MEYERDICK 3,099,468
STRUCTURAL CONNECTOR
Filed Oct. 17, 1960 2 Sheets-Sheet 1
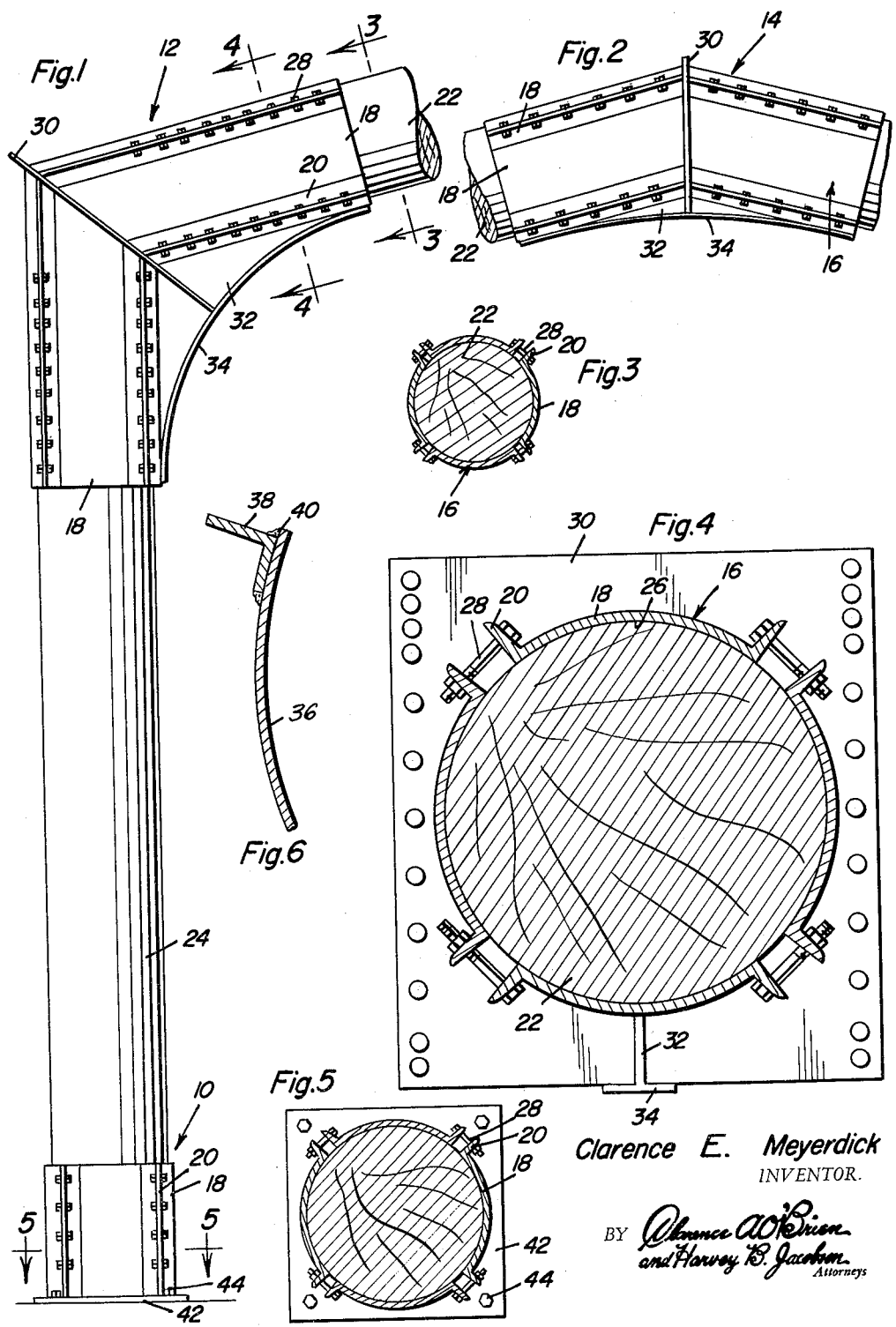
Clarence E. Meyerdick
INVENTOR.

July 30, 1963 C. E. MEYERDICK 3,099,468
STRUCTURAL CONNECTOR
Filed Oct. 17, 1960 2 Sheets-Sheet 2
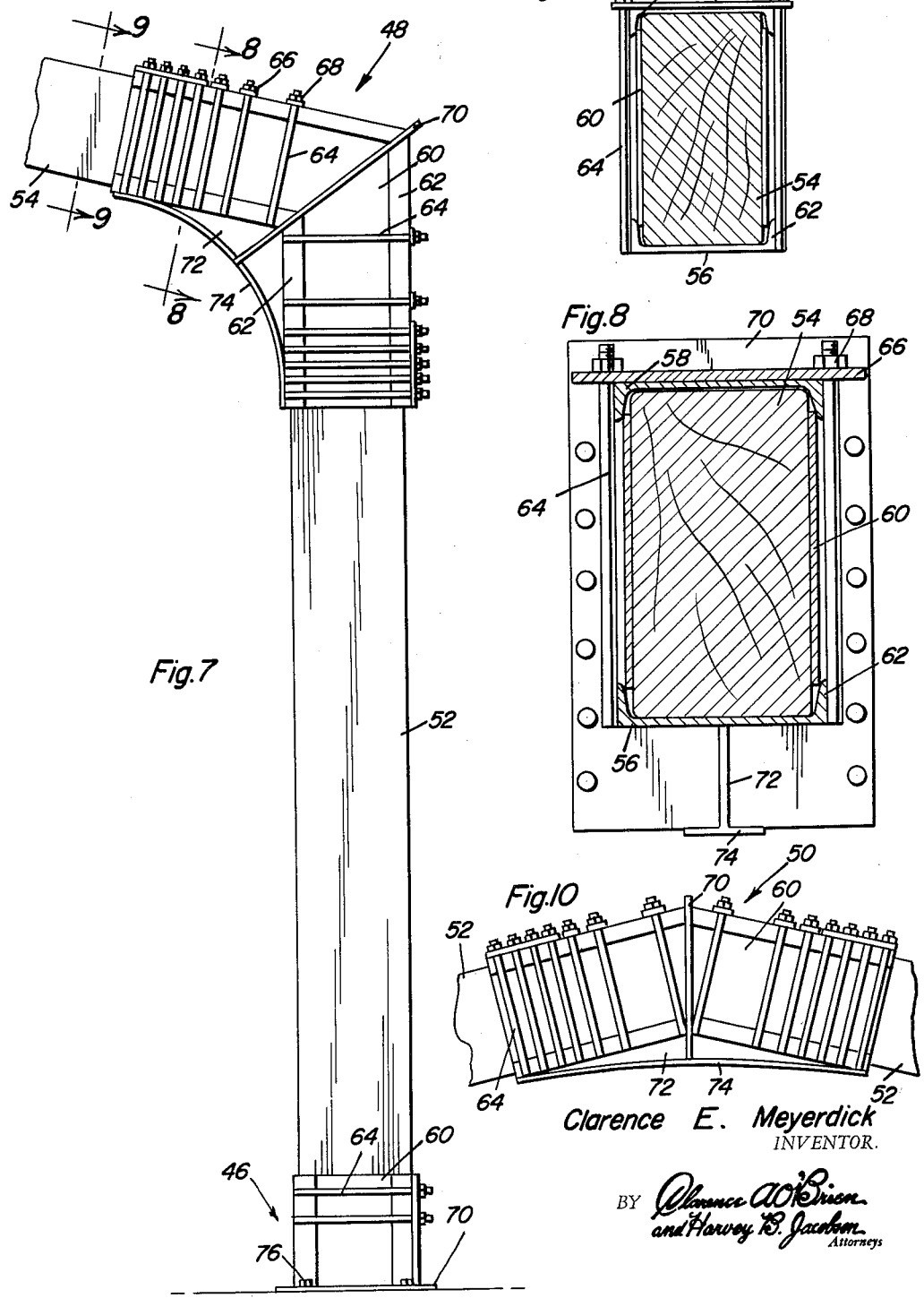
Clarence E. Meyerdick
INVENTOR.

United States Patent Office 3,099,468
Patented July 30, 1963

3,099,468
STRUCTURAL CONNECTOR
Clarence E. Meyerdick, Fair Oaks, Calif., assignor to
Clarence F. Meyerdick, Davis, Calif.
Filed Oct. 17, 1960, Ser. No. 62,935
8 Claims. (Cl. 287—54)

The present invention generally relates to a structural connector especially constructed for joining two pieces of structural timber or for joining a structural timber to some other structural member of other material and more particularly relates to a clamp-type of structural connector for transferring stress from one structural member to another.

There have been provided structural connectors for various structural elements but to the present time, there has been no connector for joining structural wood members as they come from the forest or saw mills. Structural timbers as they come from the forest are cylindrical while structural timbers cut to size by a saw mill are either square or rectangular. Accordingly, it is the primary object of the present invention to provide a structural connector for connecting one wood member to another or one wood member to a structural member of other material for directly transferring tension, compression and shear between the connected members.

More specifically, the structural connector of the present invention provides a connection of a column to a building foundation, a knee joint to connect columns to girders and a connector for connecting members at the crown of a roof with the primary purpose of the connector being to resist and transfer forces of tension, compression and shear from one structural member to another in the form of a bending moment.

Still another important object of the present invention is to provide a structural connector which is simple in construction, easy to use, extremely effective for its particular purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view illustrating the structural connectors of the present invention employed in joining a vertical building column to a foundation and as a knee joint for joining a building column to a roof girder;

FIGURE 2 is a side elevational view of the structural connector for joining roof girders together at the crown or ridge of the roof;

FIGURE 3 is a transverse, sectional view taken substantially upon a plane passing along section line 3—3 of FIGURE 1;

FIGURE 4 is a detailed sectional view taken substantially upon a plane passing along section line 4—4 of FIGURE 1 illustrating further structural details of the invention on an enlarged scale;

FIGURE 5 is a detailed sectional view taken substantially upon a plane passing along section line 5—5 of FIGURE 1 illustrating the construction of the connector for connecting the column to a foundation or the like;

FIGURE 6 is a fragmentary sectional view illustrating a slightly modified form of structure;

FIGURE 7 is a side elevational view similar to FIGURE 1 but illustrating the structural connector for use with sawed timbers;

FIGURE 8 is a detailed sectional view taken substantially upon a plane passing along section line 8—8 of FIGURE 7 illustrating the details of construction of this form of the invention on an enlarged scale;

FIGURE 9 is a detailed sectional view taken substantially upon a plane passing along section line 9—9 of FIGURE 7 illustrating the end construction of the structural connector; and FIGURE 10 is a side elevational view of the ridge connector similar to FIGURE 2 but for use with sawed timbers.

Referring now specifically to FIGURES 1-6, the group of structural connectors illustrated therein is for use with cylindrical timbers which may be tool finished at the ends thereof where the structural connectors are employed but which may be unfinished intermediate the connectors. The connectors illustrated include a connector for connecting a column to a foundation as indicated generally by the numeral 10, a knee connector for connecting the column to a roof girder as generally indicated by the numeral 12 and a crown or ridge connector for connecting two roof girders at the crown of the roof generally designated by the numeral 14.

As illustrated in FIGURE 4, the structural connector 12 is constructed from four channel-shaped members generally designated by numeral 16, each of which includes an elongated web 18 and projecting flanges 20. The web 18 is shaped in a manner to conform to the external surface of the wood girder 22 or the wood column 24. Thus, the surface of the web 18 opposite from the flanges 20 is concave as indicated by numeral 26 and forms a segment of a circle defining the exterior of the structural wood timber. The flanges 20 project radially outwardly from the arcuate web 18 and the flanges 20 are interconnected by a plurality of longitudinally spaced clamping bolts 28. Thus, by taking the clamping bolts 28, the four channels 16 are rigidly clamped to the structural timber such as the roof girder 22 illustrated in FIGURE 4.

Each of the channels 16 is rigidly affixed to a shear plate 30 such as by welding or the like whereby the shear plate and the channel 16 are rigid with each other. The channels 16 which form the attachment between the connector 12 and the column 24 are also rigidly affixed to the shear plate 30 as by welding or the like. Thus, a rigid knee joint is formed between the structural timbers 22 and 24. As a reinforcement for the knee joint, a gusset plate 32 extends radially inwardly from the inner surface of the structural connector and is rigidly secured thereto as by welding or the like and is also rigidly affixed to the shear plate 30. The inner edge of the gusset 32 is arcuately curved and provided with a transverse flange 34 rigid therewith and perpendicular thereto for further reinforcing the knee joint.

FIGURE 6 illustrates a slightly modified form of the invention in which a flat plate 36 is rolled to a required radius of curvature to fit around timber sections and flanges 38 are secured thereto as by welding 40. These structural elements may replace the channel-shaped members 16.

In FIGURE 5, the details of the base connector are illustrated and in this form of the invention, the channels 16 are welded to the base plate 42 secured to the foundation or other support by bolts or fastening members 44. The crown connector 14 illustrated in FIGURE 2 is the same as the knee joint 12 except that the angle of separation is different. As stated, the forms of the invention illustrated in FIGURES 1–6 illustrate connectors for use with round structural timbers which may be considered poles that are substantially in the form received from the forest.

In FIGURES 7–10, there are three connectors illustrated including the base connector 46, the knee joint 48 and the crown joint 50. The structural connectors are for use in connecting a vertical column 52 to a roof girder 54 or for connecting two roof girders 54 and the timbers are of a sawed construction of rectangular configuration.

In this form of the invention, the structural connector 48 includes a pair of inwardly facing channels 56 and 58 engaging opposite edges of the structural girder 54. Engaging the side surfaces of the structural girder 54 is a pair of plates 60 having the edges thereof engaged against the inner surface of the tapering flanges 62 on the channel-shaped members 56 and 58. Welded to the flanges 62 on the channel 56 is a plurality of elongated bolts 64 which extend alongside of and parallel to the plates 60 and alongside the flanges 62 on the channel-shaped member 58. A transverse plate or strap 66 is disposed over the bolts 54 and is engaged with the channel 58 whereby nuts 68 disposed on the bolts 64 retain the channels 56 and 58 as well as the plates 60 in tightly clamped engagement with the structural timber 54. The channels 56 and 58 as well as the plates 60 are rigidly secured to a shear plate 70 as by welding or the like thus rigidly securing the shear plate and the elements which engage the wood timbers in rigidly affixed relation.

The inner surface of the channel 56 is provided with a reinforcing gusset plate 72 rigidly secured to the channel 56 and also rigidly secured to the gusset 70. The inner edge of the gusset plate 72 is provided with a transverse flange 74 thus further reinforcing the joint.

In the crown connector as illustrated in FIGURE 10, the structure is the same except that the angle of connection between the shear plate and the other components is varied. In the base connector, the shear plate 70 is perpendicular to the channels 56 and 58 and is connected to a foundation or the like by bolts 76. The forms of the invention shown in FIGURES 7–9 illustrate connectors for use with rectangular or solid structural timbers.

All sizes, lengths and other dimensions of the component parts of the structural connectors will vary according to the requirements of each particular building design and will be dependent upon the stresses involved. In the event of the use of a structural steel column, the steel column is welded directly to the shear plate. If a concrete column is used, the required steel anchorage will be welded directly to the shear plate. In either case, the lower half of the knee joint for the wood column is omitted. The angle of separation between the column and girders may be varied as may the angle between the girders and the crown connection thus enabling the connectors to be used in substantially any installation. The number of bolts and the size of the channels all are variable depending upon the stresses to be encountered by the installation. Also, the external periphery of the shear plate may be provided with a plurality of openings for receiving bolts as required by design for portal bracing connections and other structural connections as may be necessary in each installation.

In the form of the invention illustrated in FIGURES 7–10, nuts may be used on both ends of the bolts in lieu of welding the bolts to the channels 56. With this construction, there is provided a rigid connection for use in connection with wood timbers and the connectors are capable of passing bending moment stresses therethrough and, of course, the connectors may be used for connecting any combination of round or rectangular wood timbers or round or rectangular wood timbers with other structural elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A structural connector for structural members comprising a plurality of longitudinally elongated members adapted to engage portions of the periphery of a structural member, longitudinal flanges on each elongated member, clamp bolts interconnecting said longitudinal members substantially throughout the length thereof for clamping the elongated members to the structural member, a shear plate extending transversely of one end of the elongated members and being rigidly affixed to each of said elongated members.

2. The structure as defined in claim 1 wherein said elongated members are arcuate and said outwardly extending flanges rigid with each longitudinal edge thereof for clampingly engaging a cylindrical wood structural member, said clamping bolt extending through said flange for securing the elongated members to the structural member.

3. The structure as defined in claim 1 wherein said shear plate is in the form of a base plate for engagement with a supporting foundation.

4. A structural connector comprising a shear plate extending transversely between adjacent ends of a pair of wood structural members to be connected, a plurality of longitudinally elongated clamping members extending from both sides of the shear plate and being rigidly affixed thereto, a laterally extending flange on each side edge of each member, and clamp bolts interconnecting the flanges on the elongated members substantially throughout the length thereof for clamping the elongated members into rigid clamped relationship to the structural members.

5. The structure as defined in claim 4 wherein each longitudinally elongated member is arcuate in configuration and having the inwardly facing surface thereof concave for engagement with a cylindrical structural wood member, each of said laterally extending flanges being rigid with a corresponding edge of an arcuate member, said flanges being normally disposed in spaced relation, said clamping bolts extending through the flanges for rigidly securing the clamping members to the structural wood member.

6. The structure as defined in claim 5 wherein a gusset plate extends between the clamping members forming the angle of separation of the structural members thereby rigidifying the connector.

7. A structural connector for structural members comprising a shear plate adapted to extend transversely between adjacent ends of a pair of structural members, a plurality of longitudinally elongated clamping members having one end rigidly attached to said shear plate, said clamping members being disposed on opposite sides of the shear plates, each clamping member having a longitudinally continuous flange on each side edge thereof, a plurality of clamp bolts interconnecting the elongated clamping members at a plurality of longitudinally spaced points thereby effectively clamping each structural member along substantially the entire length of the clamping members thereby securing the structural members to the shear plate, a gusset plate disposed perpendicularly to the shear plate and interconnecting one of the clamping members on each side of the shear plate thereto, said shear plate extending laterally beyond the clamping members and rigidly connected with said gusset plate, said gusset plate including a transverse flange on the free edge thereof for rigidifying the gusset plate against lateral deflection.

8. The structure as defined in claim 7 wherein each of said elongated clamping members is of channel shaped configuration having an arcuate web and said flanges extending outwardly at each edge thereof, said arcuate webs defining a segment of a circle and the flanges generally extending radially from the center of the defined circle for clampingly engaging a substantially cylindrical structural member throughout the peripheral surface of the webs.

References Cited in the file of this patent

UNITED STATES PATENTS

| | | |
|---|---|---|
| 279,576 | Leaycraft | June 19, 1883 |
| 740,960 | Whitmore | Oct. 6, 1903 |

FOREIGN PATENTS

| | | |
|---|---|---|
| 1,191,091 | France | Apr. 6, 1959 |